United States Patent
Kleibrink

(10) Patent No.: US 6,722,664 B2
(45) Date of Patent: Apr. 20, 2004

(54) SEAL SYSTEM FOR COVERS/FLANGE COUPLINGS UNDER HIGH PRESSURE

(76) Inventor: Horst Kleibrink, Heisenbergstr. 16, 45473 Muelheim-Ruhr (DE)

( * ) Notice: Subject to any disclaimer, the term of this patent is extended or adjusted under 35 U.S.C. 154(b) by 0 days.

(21) Appl. No.: 10/167,951

(22) Filed: Jun. 12, 2002

(65) Prior Publication Data

US 2002/0190482 A1 Dec. 19, 2002

(30) Foreign Application Priority Data

Jun. 15, 2001 (DE) .......................... 101 29 003

(51) Int. Cl.[7] .............................. F16L 17/03
(52) U.S. Cl. .............. 277/614; 277/602; 277/608; 277/623; 285/96; 285/106
(58) Field of Search ................. 277/602, 608, 277/614, 623; 285/96, 106, 349

(56) References Cited

U.S. PATENT DOCUMENTS

| | | | |
|---|---|---|---|
| 4,410,186 A | | 10/1983 | Pierce, Jr. |
| 4,527,804 A | * | 7/1985 | Spencer ............ 277/314 |
| 4,888,979 A | * | 12/1989 | Steeper ............ 73/40.7 |
| 5,090,871 A | * | 2/1992 | Story et al. ........... 417/9 |
| 5,941,530 A | * | 8/1999 | Williams ............ 277/322 |
| 6,000,278 A | * | 12/1999 | Hystad ............. 73/46 |
| 6,267,414 B1 | * | 7/2001 | Mosse ............. 285/24 |

FOREIGN PATENT DOCUMENTS

| | | |
|---|---|---|
| CH | 374256 | 2/1964 |
| DE | 106534 | 11/1899 |
| DE | 848128 | 9/1952 |
| DE | 1888462 U | 2/1964 |
| DE | 1959561 | 12/1974 |
| DE | 296333 | 11/1991 |
| GB | 950440 | 2/1964 |
| GB | 1009221 | 11/1965 |

* cited by examiner

Primary Examiner—Anthony Knight
Assistant Examiner—E Peavey
(74) Attorney, Agent, or Firm—McCormick, Paulding & Huber LLP

(57) ABSTRACT

A high pressure seal consists of a minimal convex excess which induces a plastic-elastic deformation on the flat opposing surface. The excess can also be formed by means of a ring with a circular cross section which after tightening of the screw coupling likewise forms a small convex excess. Removal of the ring without damage is accomplished by application of pressure by means of a smaller additional groove and a pressure feeding bore discharging into the additional groove.

1 Claim, 2 Drawing Sheets

US 6,722,664 B2

SEAL SYSTEM FOR COVERS/FLANGE COUPLINGS UNDER HIGH PRESSURE

CROSS REFERENCE TO RELATED APPLICATION

Applicant hereby claims foreign priority under 35 U.S.C. §119 from German Application No. 10129003.9, filed Jun. 16, 2001, the disclosure of which is herein incorporated by reference.

BACKGROUND OF THE INVENTION

The invention relates to seal system for covers or flange couplings that are under high pressure.

For covers or flange couplings there are a plurality of potential seal types. In high pressure applications, one type has been developed in which a somewhat raised rounded knife edge upon tightening on one side produces a small deformation in the plane surface of the opposite side. This elastic-plastic working in the seal region guarantees consistently a reliable sealing of gases and fluids in a high pressure region whereby pressures of up to more than 1,000 bar are common. The connection can very often be unfastened and again closed without having to re-work the seal region unless it should happen that mechanical damage should be found. Mechanical damage or chemical attack requires as described a re-working in the seal region. On these grounds a seal exchangeable on the spot would employ the same principles in which a metal ring inlayed in a half round groove after tightening the threaded connection is fully embedded with a minimal excess projecting against the basic cover surface. This excess forms the raised rounded knife edge of the above described high pressure seal.

A disadvantage of this type of seal ring is the disassembly. Due to the pressure process, the ring rests so firmly in the grove that it must be chiseled out of its position. The residue can then be pulled out with suitable tongs. However the chisel process just described possesses a significant danger that the groove or alternatively the surrounding surface will be damaged. Then the supplemental work, for example for a large cover of a diaphragm compressor, will be a very expensive matter.

In Swiss patent CH 374,256, U.S. Pat. No. 4,410,186 and German patent DD 296,333 A5 and British patent GB 1,009,221 apparatuses are described with a groove having an inlaid seal body wherein the base of the groove remains connected with the surroundings by means of a boring which, however, only serves the purpose of leakage control for the inserted seal body.

In German patent DE 848,128 C and British patent GB 950,440 the channels, which define the bottom of the groove serve only as the feed means for a pressurizing medium in order to produce the pre-stressing of the seal necessary for the sealing function.

Furthermore there are devices, described in German patents DE 106,534C, DE 1,959,561B and DE 1,888,462U, in which a comparable ring embedded in a groove is provided, however, without any type of backside groove or channels with borings.

SUMMARY OF THE INVENTION

An object of the invention is the provision of a seal which combines the mentioned advantages of the prior art, however, also better and without the risk of damage as can again be demonstrated.

This object is achieved by means of a concentric half round groove encircling the cover with a very small relief groove in the bottom of the groove. A small pressure feeding bore discharges into the relief groove from the backside of the cover. A metal ring, after insertion in the half round groove and after pre-stressing by the screw connection or bolt connections, completely fills the half round groove and only a small portion of the relief groove, and accordingly forms a minimal excess at the basic cover surface which together with the opposite flange surface forms a high pressure seal.

BRIEF DESCRIPTION OF THE DRAWINGS

The invention is further described with the aid of the following drawings.

FIGS. 1 and 2 are concerned with exemplary embodiments according to the prior art.

DESCRIPTION OF THE PREFERRED EMBODIMENTS

Figure 1:
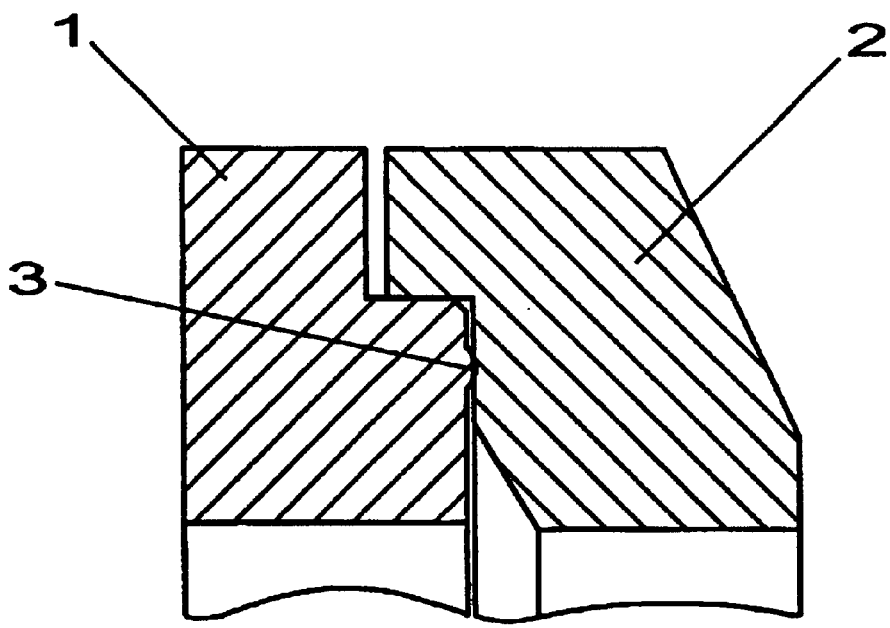
FIG. 1 shows a standard high pressure seal with a circular seal edge.

The cover or flange coupling illustrated in FIG. 1 can be described as a classic type of high pressure seal. Here the cover part 1 is provided with a circular, slightly raised and rounded seal edge 3 which with tightening of the threaded coupling leaves a plastic-elastic impression in the smooth and flat opposing surface of the flange part 2. This region forms a seal with the aforementioned sealing properties in the realm of gases and fluids up to the highest pressures. One such seal is unlimited in durability and reusability in the sense of opening and closing the connection. With damage resulting from improper handling or through chemical attack the seal region must then be re-worked at some cost.

Figure 2:
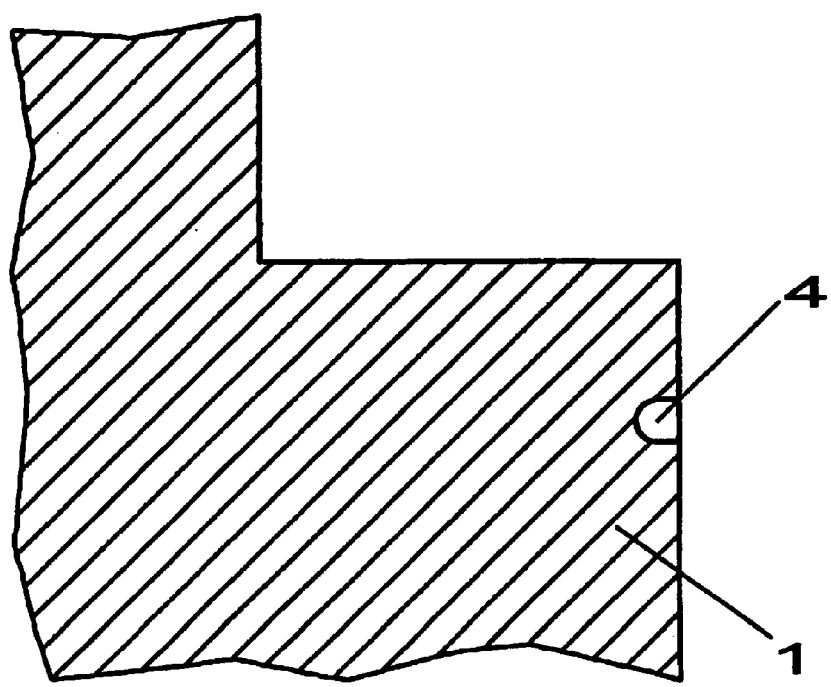
FIG. 2 shows a cover with a ring shaped groove instead of the circular seal edge.

A further development forms the seal region illustrated in FIG. 2 which consists of a circular groove 4 in place of the circular raised sealing edge 3. Then a metal ring with a circular cross-section is inserted in the groove. The groove and the metal ring are sized such that after the tightening of the threaded coupling a small excess of the ring is formed which corresponds approximately to the sealing edge 3 illustrated in FIG. 1. This construction is especially advantageous in cases of very large seal diameters, as for example with the heads of diaphragm compressors. With damage of the rings due to improper handling or through chemical attack they can be exchanged whereby such work also poses great risk. In such case a small chisel must be employed in order to first separate the ring and then thereafter to pull out the remainder. The separation of the ring requires a high level of skill so as not to damage the groove itself. In that event the repair action would result in high costs.

Figure 3:
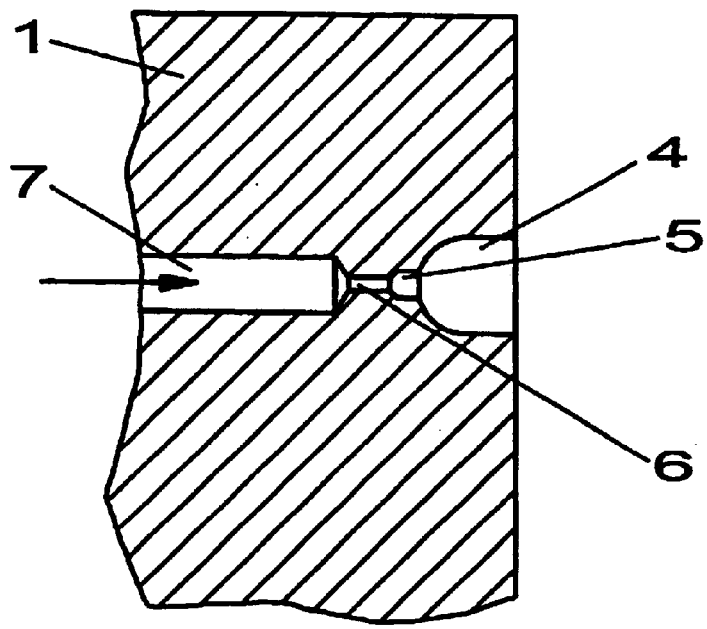
FIGS. 3 and 4 show an embodiment of the ring groove region corresponding to the features of the present invention.
Figure 4:
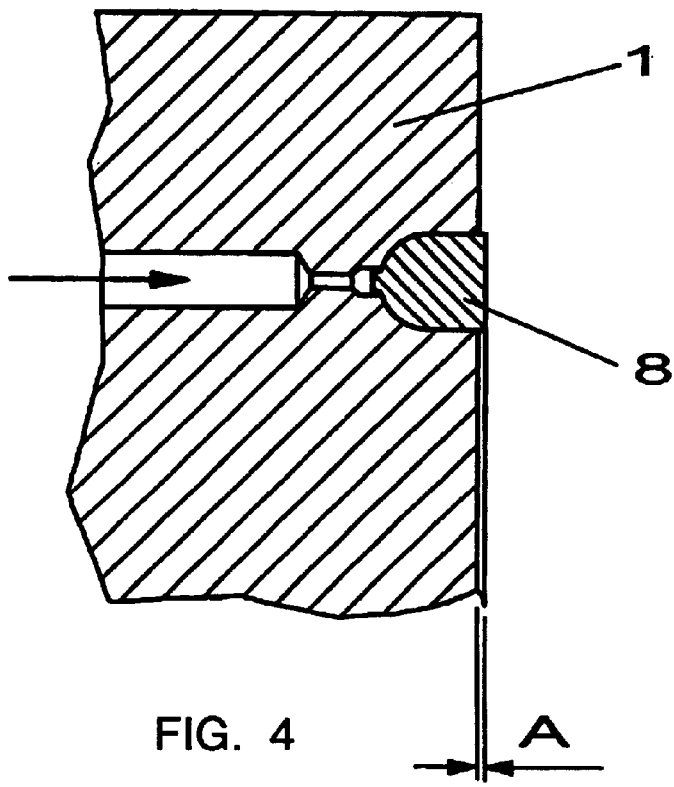

With the embodiment in FIGS. 3 and 4 a relief groove 5 is additionally cut into the bottom of the existing groove 4 and is connected with the backside of the cover by a small pressure feeding bore 6. This small bore 6, preferably drilled from the groove bottom, leads into the larger bore 7 which is drilled from the outer surface of the cover. In this bore pressure by means of hand pump is produced during disassembly of the ring whereby the ring and can then be extracted without risk of damage.

In FIG. 4 a metal ring 8 already deformed by the threaded coupling is illustrated and its resulting excess A forms a sealing edge.

The combination of the groove 4 with the additional groove 5 and the pressure feeding bores 6 are prerequisites for the fact that the excess A is quite even along its entire circumference and with this the seal is completely functional. Accordingly, two important objects come with the additional groove 5. First is the uniform pressure distribution upon disassembly of the ring. However, a still more important part lies in that with the tightening of the screw coupling the seal ring cannot flow partially into a pressure feeding bore lying directly in the bottom of the groove 4. By this means a small depression in the excess A of the seal is not produced, which would lead to a nonrepairable inability to seal. The additional groove 5 guarantees a uniform flow of the ring material along the entire circumference, however avoids also the further flow into the pressure feeding bore 6 since the ring material is not in a position to follow the partial two-step reduction in size. With this the formation of a depression in the seal region due to the flowing of the ring material in the rearward bore is foreclosed.

What is claimed is:

1. A seal system for covers or flange couplings under high pressure characterized by a concentric half round groove cut into the cover (1) with a very small relief groove (5) formed in the bottom of the groove, a small pressure feeding bore (6) discharging into the relief groove from the back side of the cover and a metal ring (8), which after insertion into the groove (4) and after tightening of a screw coupling the half round groove (4) and only small portion of the relief groove (5) are completely filled and thereby a minimal excess A is formed at the basic cover surface which together with the opposing surface of the flange produces a high pressure seal.

* * * * *